United States Patent
Stalfors et al.

(10) Patent No.: US 10,605,216 B2
(45) Date of Patent: Mar. 31, 2020

(54) METHOD AND SYSTEM FOR STARTING AN INTERNAL COMBUSTION ENGINE OF A HYBRID VEHICLE AND A HYBRID VEHICLE COMPRISING A SYSTEM FOR STARTING AN INTERNAL COMBUSTION ENGINE

(71) Applicant: Volvo Car Corporation, Gothenburg (SE)

(72) Inventors: Tobias Stalfors, Gothenburg (SE); Jonas Forssell, Torslanda (SE); Mathias Jorgensson, Stenungsund (SE)

(73) Assignee: Volvo Car Corporation, Gothenburg (SE)

( * ) Notice: Subject to any disclaimer, the term of this patent is extended or adjusted under 35 U.S.C. 154(b) by 94 days.

(21) Appl. No.: 15/726,845

(22) Filed: Oct. 6, 2017

(65) Prior Publication Data
US 2018/0180011 A1 Jun. 28, 2018

(30) Foreign Application Priority Data
Dec. 27, 2016 (EP) ..................................... 16206923

(51) Int. Cl.
*B60W 10/08* (2006.01)
*F02N 5/04* (2006.01)
(Continued)

(52) U.S. Cl.
CPC .................. *F02N 5/04* (2013.01); *B60K 6/38* (2013.01); *B60K 6/387* (2013.01); *B60K 6/48* (2013.01);
(Continued)

(58) Field of Classification Search
CPC .......... F02N 5/04; F02N 11/00; F02N 15/022; B60K 6/48; B60K 6/547; B60W 10/02;
(Continued)

(56) References Cited

U.S. PATENT DOCUMENTS 6,098,584 A 8/2000 Ahner et al.
8,060,268 B2 * 11/2011 Hasegawa ................ B60K 6/48
701/22

(Continued)

FOREIGN PATENT DOCUMENTS

DE 102007045365 A1 4/2009
GB 2413998 A 11/2005

*Primary Examiner* — Hai H Huynh
*Assistant Examiner* — Gonzalo Laguarda
(74) *Attorney, Agent, or Firm* — Snyder, Clark, Lesch & Chung, LLP

(57) ABSTRACT

Method and system for starting an internal combustion engine that rotates a drive shaft providing torque to a driving wheel via a transmission unit comprising a first clutch connecting the engine to an input shaft of a gearbox connected to a torque converter. The torque converter is connected to a second clutch connected to the driving wheel through a transmission, and the input shaft is connected to an auxiliary drive source in an offset arrangement with a predetermined torque ratio between the input shaft and the auxiliary drive source. Starting the engine comprises disengaging the first clutch, disengaging the second clutch to a predetermined torque level, accelerating the input shaft and the torque converter with the auxiliary drive source to a predetermined rotational speed, and engaging the first clutch to start the engine with the energy stored in the input shaft, the torque converter, and the auxiliary drive source.

20 Claims, 3 Drawing Sheets

(51) Int. Cl.

| | |
|---|---|
| *B60K 6/48* | (2007.10) |
| *B60W 10/02* | (2006.01) |
| *B60W 20/40* | (2016.01) |
| *B60W 10/06* | (2006.01) |
| *F02N 15/02* | (2006.01) |
| *F02N 11/00* | (2006.01) |
| *B60K 6/387* | (2007.10) |
| *B60W 10/11* | (2012.01) |
| *B60K 6/547* | (2007.10) |
| *B60K 6/38* | (2007.10) |
| *F02N 11/04* | (2006.01) |
| *F02N 15/08* | (2006.01) |

(52) U.S. Cl.
CPC ............. *B60K 6/547* (2013.01); *B60W 10/02* (2013.01); *B60W 10/023* (2013.01); *B60W 10/026* (2013.01); *B60W 10/06* (2013.01); *B60W 10/08* (2013.01); *B60W 10/11* (2013.01); *B60W 20/40* (2013.01); *F02N 11/00* (2013.01); *F02N 15/022* (2013.01); *B60K 2006/4825* (2013.01); *B60K 2006/4833* (2013.01); *B60W 2710/021* (2013.01); *B60W 2710/024* (2013.01); *B60W 2710/1011* (2013.01); *F02N 11/04* (2013.01); *F02N 15/02* (2013.01); *F02N 15/08* (2013.01)

(58) Field of Classification Search
CPC ...... B60W 10/06; B60W 10/08; B60W 20/40; Y02T 10/6221
USPC ...... 123/179.28, 179.25; 290/36 R, 38 R, 48
See application file for complete search history.

(56) References Cited

U.S. PATENT DOCUMENTS

| | | | |
|---|---|---|---|
| 9,738,265 B2* | 8/2017 | Johri | B60W 10/02 |
| 2004/0173393 A1 | 9/2004 | Man et al. | |
| 2005/0284674 A1 | 12/2005 | Menne et al. | |
| 2010/0204006 A1 | 8/2010 | Mittelberger et al. | |
| 2010/0250037 A1* | 9/2010 | Yoshida | B60K 6/365 |
| | | | 701/22 |
| 2011/0130911 A1 | 6/2011 | Allgauer et al. | |
| 2012/0122630 A1 | 5/2012 | Huber et al. | |
| 2014/0342873 A1* | 11/2014 | Inoue | B60K 6/48 |
| | | | 477/5 |
| 2014/0379232 A1* | 12/2014 | Kobayashi | B60K 6/48 |
| | | | 701/67 |
| 2015/0080175 A1* | 3/2015 | Kobayashi | B60K 6/48 |
| | | | 477/5 |
| 2015/0149009 A1* | 5/2015 | Michikoshi | B60K 6/48 |
| | | | 701/22 |
| 2016/0031434 A1 | 2/2016 | Thompson et al. | |
| 2017/0259803 A1* | 9/2017 | Khafagy | B60W 20/13 |
| 2017/0259808 A1* | 9/2017 | Makled | B60K 6/48 |

* cited by examiner

METHOD AND SYSTEM FOR STARTING AN INTERNAL COMBUSTION ENGINE OF A HYBRID VEHICLE AND A HYBRID VEHICLE COMPRISING A SYSTEM FOR STARTING AN INTERNAL COMBUSTION ENGINE

RELATED APPLICATION

This application claims priority under 35 U.S.C. § 119 based on European Patent Application No. EP16206923.1, filed Dec. 27, 2016, the disclosure of which is hereby incorporated by reference herein.

TECHNICAL FIELD

The present disclosure relates to a method for starting an internal combustion engine of a hybrid vehicle, where the internal combustion engine is adapted to rotate a drive shaft providing torque to at least one driving wheel of the hybrid vehicle via a transmission unit. The disclosure also relates to a system for starting an internal combustion engine of a hybrid vehicle, a hybrid vehicle comprising a system for starting an internal combustion engine, a computer program and a computer program product.

BACKGROUND

Hybrid vehicles using a combination of an internal combustion engine and an auxiliary drive source, such as an electric motor, are becoming more and more popular due to their efficient use of energy. The internal combustion engine can be operated intermittently to provide power to the hybrid vehicle's driveline when needed depending on the driving conditions. In low speed driving situations the hybrid vehicle may be operated by only using the auxiliary drive source and when more power is needed the internal combustion engine supplies additional power to the driveline, for example when driving at higher speeds. For hybrid vehicles of the parallel type, both the internal combustion engine and the auxiliary drive source could drive one or more driving wheels through the hybrid vehicle's transmission unit.

When starting an internal combustion engine, usually a traditional 12 V starter system with a starter motor is used. Modern hybrid vehicles however use 48 V electrical systems, or systems with other voltages, with lithium-ion batteries. An electrical starter motor could also be used in a 48 V system for starting the internal combustion engine in different driving conditions or for cold starts. The 48 V lithium-ion type of batteries are however in cold weather conditions limited in power, which makes it difficult to start the internal combustion engine in low temperature situations, such as in temperatures below −15° C. or even as low as −30° C., with a starter motor powered by the 48 V battery. Another complexity with an internal combustion engine at low temperatures is that the friction or drag torque at very low temperatures could exceed the maximum torque available from the starter motor in a 48 V electrical system, especially for diesel engines. Thus, cold starts at low temperatures using a starter motor in a modern 48 V hybrid vehicle electrical system could be difficult or even impossible.

One common solution to this problem is to use a 12 V starter motor having a conventional 12 V lead battery. Another alternative for starting an internal combustion engine is to use a flywheel for starting the internal combustion engine through using energy stored in the flywheel.

U.S. Pat. No. 6,098,584A discloses a starter apparatus for an internal combustion engine including a device for rotating a flywheel that in an impulse starting method is used for starting the engine with the rotational energy stored in the flywheel. Alternatively, a direct starting method could be used, where a starter-generator is directly coupled to the engine. A changeover device switches between the direct starting method and the impulse starting method as a function of the temperature of the engine so that the impulse starting method is used at comparatively lower temperatures and the direct starting method is used at comparatively higher temperatures.

A major disadvantage with a starter apparatus of this kind is that the solution is not suitable for modern hybrid vehicles that need a very compact engine and transmission design, including both an internal combustion engine and an auxiliary drive source with the possibility to start the internal combustion engine during different driving conditions that also is suitable for cold starts in very low temperatures. There is also a risk with a starter apparatus of the above described type that hesitation occurs when switching from an electrical driving mode, where the auxiliary drive source is delivering power, to a hybrid driving mode, where also the internal combustion engine is delivering power to the hybrid vehicle.

GB 2413998 A discloses method of controlling the drive train of a hybrid vehicle, where an engine is started by an electric motor generator connected to a flywheel. The vehicle is provided with a parallel hybrid drive with a series arrangement of the engine, the motor generator and a drive gear connected to a drive axle. Controllable friction clutches are provided at the input and output sides of the motor generator respectively. In an exclusively electric mode, the flywheel is accelerated by the motor generator to build up surplus momentum, where the output clutch is controlled in a slip mode. Closure of the motor input side clutch then starts the engine.

In this solution, a separate flywheel driven by an inline motor generator is used to provide sufficient torque to start the engine of the vehicle. Since the components are arranged in series, the solution is not suitable for a compact packing of a hybrid engine. Another disadvantage is that an inline motor generator must be relatively large to be able to provide the required torque to start the engine. Further, by using a separate flywheel, additional weight is added to the system.

There is thus a need for an improved way of starting an internal combustion engine in a hybrid vehicle having a compact engine and transmission design including both an internal combustion engine and an auxiliary drive source that prevents hesitation when starting the internal combustion engine and also could start the internal combustion engine in very low temperatures, such as down to −30° C.

SUMMARY

An object of the present disclosure is to provide a method and a system for starting an internal combustion engine of a hybrid vehicle, where the previously mentioned problems during the starting of an internal combustion engine are avoided. This object is at least partly achieved by the features of the independent claims. The other claims contain further developments of the inventive method and system. The claims also contain a hybrid vehicle comprising a system for starting an internal combustion engine, a computer program and a computer program product for performing such a method.

The disclosure concerns a method for starting an internal combustion engine of a hybrid vehicle, where the internal combustion engine is adapted to rotate a drive shaft providing torque to at least one driving wheel of the hybrid vehicle via a transmission unit; where the transmission unit comprises a first clutch connecting the internal combustion engine to an input shaft of a gearbox connected to a torque converter, where the torque converter is connected to a second clutch connecting the torque converter to the at least one driving wheel through a transmission, where the input shaft is connected to an auxiliary drive source in an offset arrangement with a predetermined torque ratio between the input shaft and the auxiliary drive source; the method comprising the steps of disengaging the first clutch, disengaging the second clutch to a predetermined torque level, accelerating the input shaft and the torque converter with the auxiliary drive source to a predetermined rotational speed, and engaging the first clutch to start the internal combustion engine with the energy stored in the input shaft, in the torque converter and in the auxiliary drive source. Advantages with the method described above are that a compact engine and transmission design can be used, including both an internal combustion engine and an auxiliary drive source. Further, the method prevents hesitation when starting the internal combustion engine.

According to an aspect of the disclosure, the lock-up clutch of the torque converter is engaged when the input shaft and the torque converter are accelerated by the auxiliary drive source. In this way, also the second half of the torque converter and part of the second clutch can be used to store torque for starting the internal combustion engine.

According to an aspect of the disclosure, the predetermined torque level of the second clutch is zero. An advantage with this feature is that the internal combustion engine can be started in very low temperatures.

According to an aspect of the disclosure, the predetermined rotational speed of the internal shaft is ranging between 100 rpm and 5000 rpm.

According to an aspect of the disclosure, the predetermined torque level is above zero and the predetermined torque level is maintained until the input shaft and the torque converter are accelerated to start the internal combustion engine. An advantage with these features is that the internal combustion engine can be started without hesitation when the hybrid vehicle is running.

According to an aspect of the disclosure, the torque level of the second clutch is ranging between 30 Newton meter (Nm) and 300 Nm.

According to an aspect of the disclosure, the predetermined rotational speed of the input shaft is ranging between 50 rotations per minute (rpm) and 1000 rpm above the rotational speed of the internal combustion engine.

According to an aspect of the disclosure, the method further comprises the step that the second clutch is engaged to a fully engaged state to deliver torque to the at least one driving wheel of the hybrid vehicle when the internal combustion engine has started. An advantage with this feature is that the internal combustion engine can be started without hesitation.

According to an aspect of the disclosure, the predetermined torque ratio between the input shaft and the auxiliary drive source is ranging between 1:2 and 1:4.

The disclosure further concerns a system for starting an internal combustion engine of a hybrid vehicle, where the internal combustion engine is adapted to rotate a drive shaft providing torque to at least one driving wheel of the hybrid vehicle via a transmission unit, where the transmission unit comprises a first clutch connecting the internal combustion engine to an input shaft of a gearbox connected to a torque converter, where the torque converter is connected to a second clutch connecting the torque converter to the at least one driving wheel through a transmission, where the input shaft is connected to an auxiliary drive source in an offset arrangement with a predetermined torque ratio between the input shaft and the auxiliary drive source, where the input shaft and the torque converter are accelerated with the auxiliary drive source to a predetermined rotational speed to start the internal combustion engine with the energy stored in the input shaft, the torque converter and the auxiliary drive source, after disengaging the first clutch completely and disengaging the second clutch to a predetermined torque level. One advantage with the system described above is that a compact engine and transmission design can be used, including both an internal combustion engine and an auxiliary drive source.

According to an aspect of the disclosure, the first clutch is integrated with the first pulley. In this way, a very compact solution is obtained, where the additional length of the first clutch and the auxiliary drive source added to the engine-transmission installation of the vehicle is in the range of a few centimeters. It is thus possible to fit the system also in compact cars having a transverse engine arrangement.

The disclosure further concerns a hybrid vehicle having a system for starting an internal combustion engine, a computer program and computer program product.

BRIEF DESCRIPTION OF DRAWINGS

The invention will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
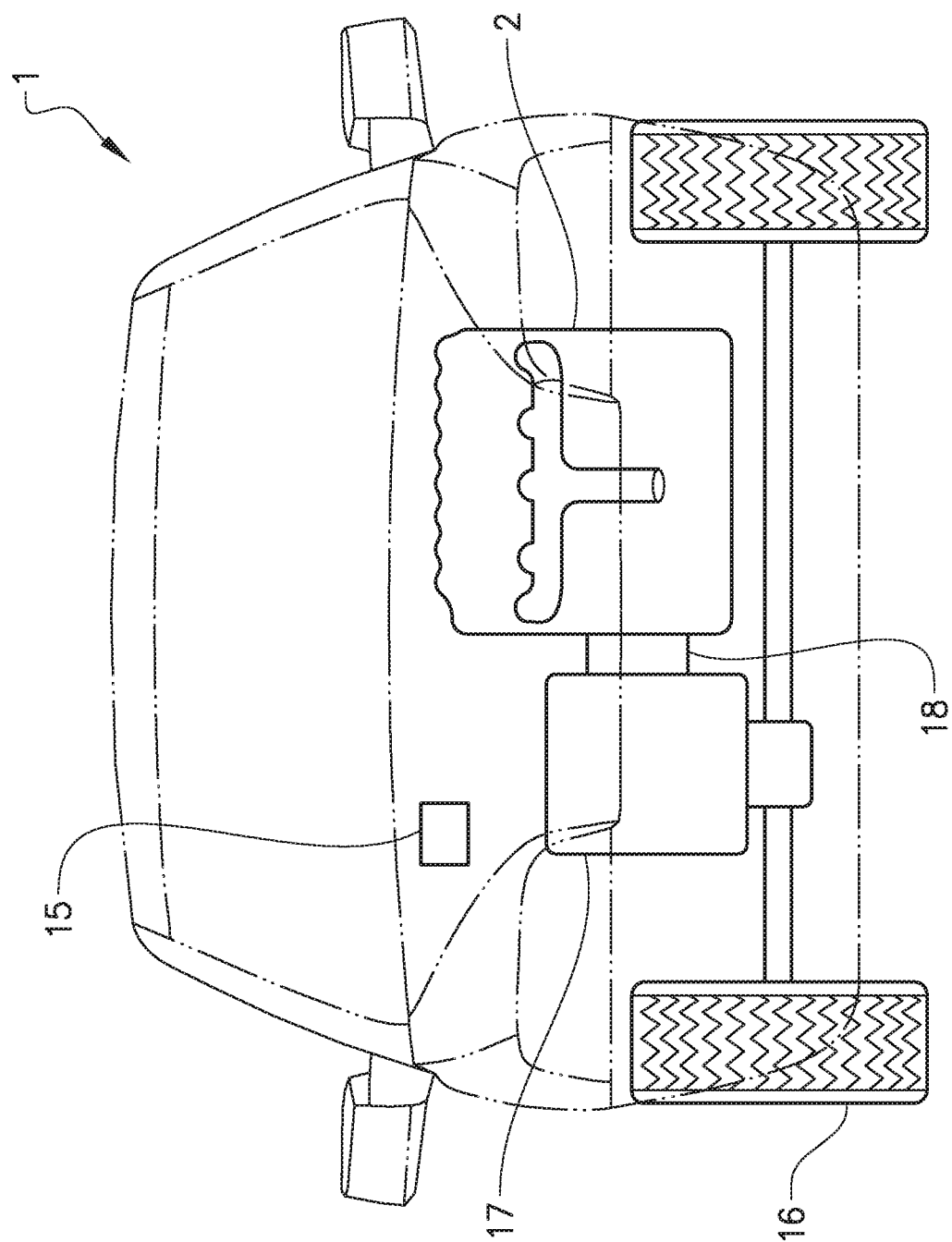
FIG. 1 shows schematically, an example of a hybrid vehicle with a system for starting an internal combustion engine according to the disclosure.

FIG. 1 schematically shows a hybrid vehicle 1 in form of a car with a schematic driveline indicated with dashed lines to illustrate the limited available transversal space in the body of a modern car. The driveline comprises an internal combustion engine 2, a transmission unit 17 connected to the internal combustion engine via a drive shaft 18. The internal combustion engine may provide torque to at least one driving wheel 16 of the hybrid vehicle 1 via the transmission unit 17.

Figure 2:
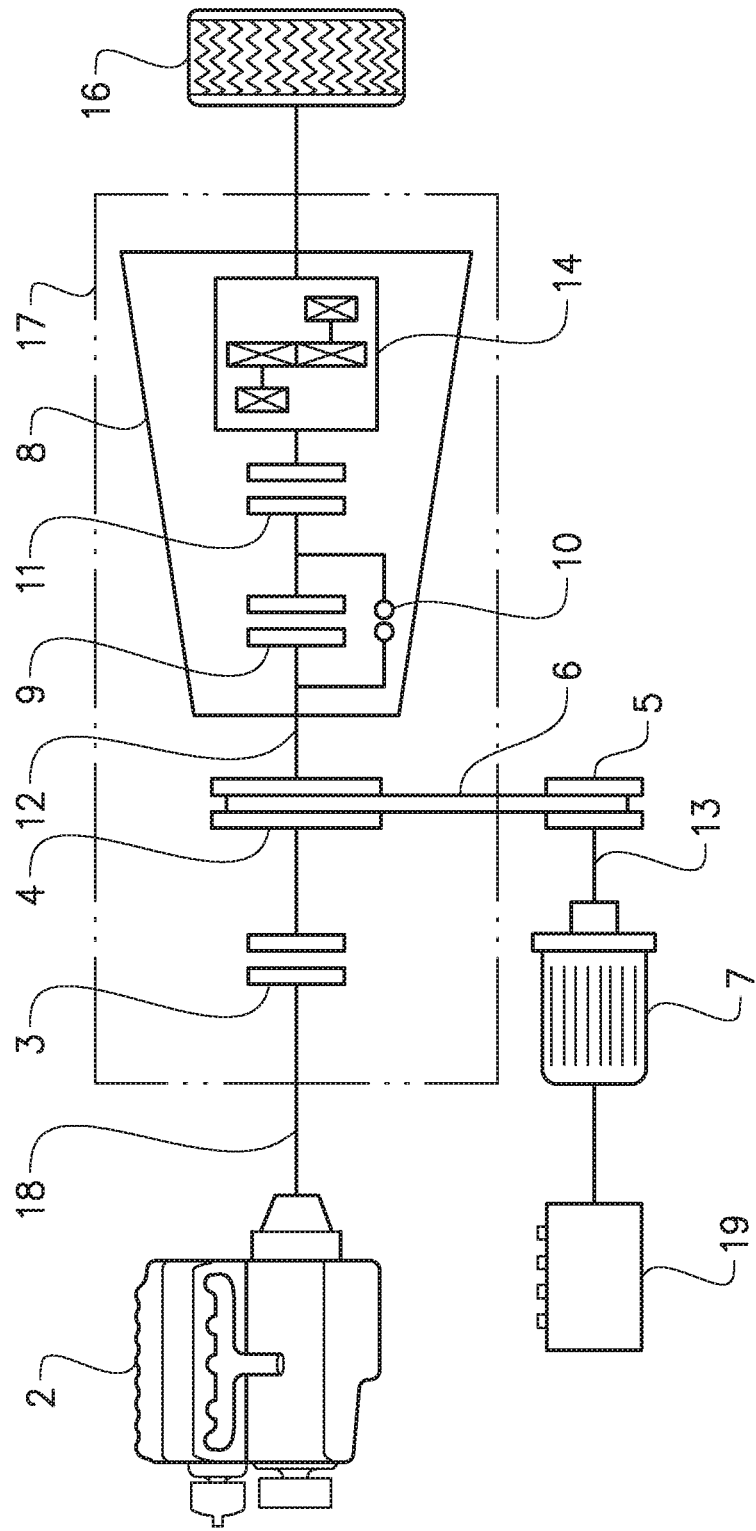
FIG. 2 shows schematically, an example of a system for starting an internal combustion engine of a hybrid vehicle according to the disclosure.

FIG. 2 schematically shows a system for starting the internal combustion engine 2 of the hybrid vehicle 1, where the internal combustion engine 2 rotates the drive shaft 18 that provides torque to the at least one of the driving wheels 16 of the hybrid vehicle 1 via the transmission unit 17. The transmission unit 17 comprises a first clutch 3 that is connecting the internal combustion engine 2 to an input shaft 12 of a gearbox 8. The input shaft 12 is connected to a torque converter 10 of the gearbox 8. The torque converter is provided with a lock-up clutch 9 which can be used to lock the torque converter 10 when the rotational speed of the input shaft and the second clutch should be the same. At e.g. low engine speeds, the lock-up clutch is preferably disengaged, i.e. open. The torque converter 10 is connected to a second clutch 11, which in turn connects the torque converter 10 to the at least one driving wheel 16 through a transmission 14. The transmission 14 is provided with a plurality of cog wheels adapted to set the rotational ratio between the second clutch and the driving wheel. The input shaft is further connected to an auxiliary drive source 7 with a first pulley 4 mounted on the input shaft 12 and a second pulley 5 mounted on the auxiliary drive source 7. A flexible driving member 6 connects the first pulley with the second pulley.

The hybrid vehicle 1 is using a combination of the internal combustion engine 2 and the auxiliary drive source 7 as power sources to provide torque to at least one of the driving wheels 16 of the vehicle 1. The internal combustion engine 2 can be operated intermittently to provide power to the hybrid vehicle's 1 driveline when needed depending on the driving conditions. In for example low speed driving situations, the hybrid vehicle 1 may be operated by only using the auxiliary drive source 7 and when more power is needed the internal combustion engine 2 supplies additional power to the driveline, for example when driving at higher speeds. Both the internal combustion engine 2 and the auxiliary drive source 7 could drive one or more driving wheels 16 through the hybrid vehicle's 1 transmission unit 17.

The hybrid vehicle 1 uses in this example a 48 V electrical system with an electric energy storage device 19. The electric energy storage device 19 may for example be a system of lithium-ion battery cells providing electric energy to the auxiliary drive source 7 and other electrical components of the hybrid vehicle 1. Any type of suitable battery cells or supercapacitors may be used as electric energy storage device, either separately or in combination. Since the hybrid vehicle 1 is adapted to be used in a fully electrical mode only for short distances, the battery may be rather limited in size and power. The auxiliary drive source 7 may be in the form of an electric machine functioning as both electric motor and generator. The electric machine supplies power to the hybrid vehicle 1 in the electrical driving mode. When the internal combustion engine 2 provides power to the hybrid vehicle 1, the electric machine may function as a generator for charging the electric energy storage device 19. The electric machine may also be used for recovering braking energy and the recovered braking energy may be used for charging the electric energy storage device 19. The electric energy storage device and the electrical system may also have other voltages.

Figure 3:
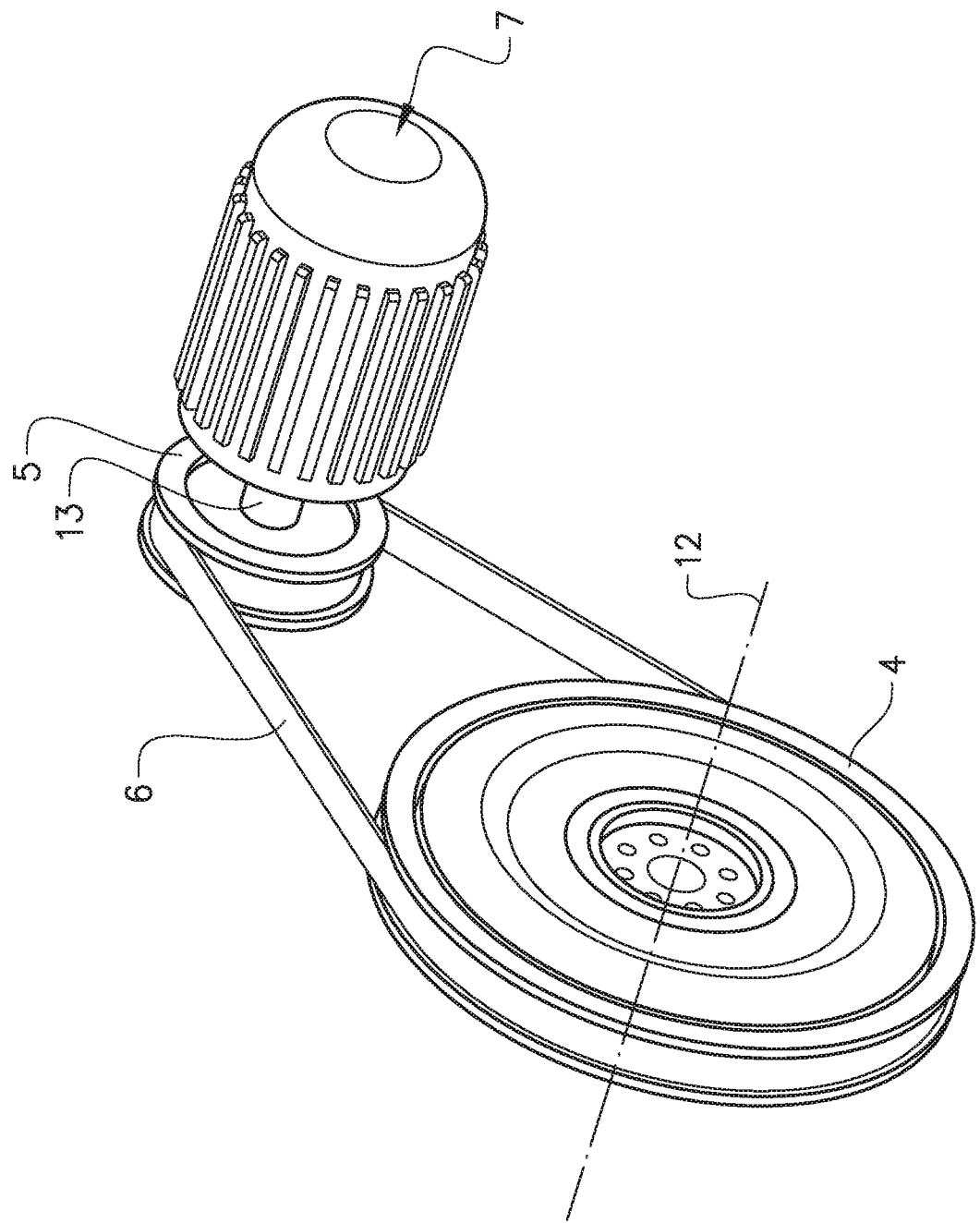
FIG. 3 shows schematically an auxiliary drive source with a pulley for starting an internal combustion engine according to the disclosure.

FIG. 3 schematically shows the auxiliary drive source 7, the first pulley 4 and the second pulley 5. The auxiliary drive source 7 may not only be used for supplying power to the driving wheels 16 but also for starting the internal combustion engine 2. There is thus no need for having a separate electrical starter motor for starting the internal combustion engine 2, which gives a more compact design that is needed in modern hybrid vehicles, and which saves weight. The auxiliary drive source 7 is connected to the input shaft via a flexible driving member 6. The flexible driving member 6 may e.g. be a drive belt with or without teeth that transfers torque to or from the auxiliary drive source 7. Alternatively, the first and second pulley may also be provided with teeth adapted to interact with a chain instead of a belt. A shaft 13 extends from the auxiliary drive source 7 to the second pulley 5. The second pulley 5 has a smaller radius than the first pulley 4 such that a fixed torque ratio is established between the second pulley 5 and the first pulley 4. The torque ratio may differ depending for example on the type of hybrid vehicle and the torque delivered by the auxiliary drive source 7, but is typically ranging between 1:2 and 1:4, to establish sufficient power needed to drive the vehicle 1 and to start the engine. In this way a relatively small and compact electric machine can be used.

As shown in FIG. 3, the auxiliary drive source 7 is through the arrangement with the flexible driving member 6 arranged in an offset relationship to the input shaft 12, instead of being connected in line with the input shaft 12. This offset arrangement keeps the increase in length of the transmission unit 17 to a minimum, which gives a compact design suitable for modern hybrid vehicles. The design with the flexible driving member 6 extending in the radial direction in relation to the input shaft 12 provides for space saving in the critical length direction of the transmission unit 17. A further advantage is that the auxiliary drive source can easily be exchanged to other types of electric machines without affecting the engine-transmission installation, e.g. when a more powerful electric machine is required for a larger engine or an electric machine with another voltage is to be used. The electric machine can also easily be replaced if it is worn or broken.

Before starting the internal combustion engine 2 the auxiliary drive source 7 accelerates the input shaft 12 and the torque converter 10 via the flexible driving member 6 to a pre-determined rotational speed, depending on the driving conditions. The rotational speed of the input shaft can be varied depending on the torque needed to start the internal combustion engine 2 and is adapted to the driving situation and other parameters, such as for example engine temperature. Through the rotational speed, energy is stored in the rotating mass of the input shaft 12, the torque converter 10 and the auxiliary drive source 7, which is used to start the internal combustion engine 2. By engaging the lock-up clutch of the torque converter when the input shaft and the torque converter are accelerated by the auxiliary drive source, also the second half of the torque converter and part of the second clutch can be used to store torque for starting the internal combustion engine.

Here, the input shaft and the torque converter are used to describe the rotational mass of the system that is accelerated by the auxiliary drive source. However, all rotating parts that are arranged between the first clutch 3 and the second clutch are comprised in the rotational mass. This includes the auxiliary drive source itself, the first pulley, the second pulley, the flexible driving member, the parts of the torque converter, the internal shaft between the torque converter and the second clutch.

When accelerating the mass of the input shaft and the torque converter, the internal combustion engine 2 is disconnected from the input shaft via the first clutch 3. The first clutch 3 is arranged to engage the input shaft in a closed state and to disengage the input shaft in an open state in relation to the internal combustion engine 2. The first clutch 3 could for example be a traditional friction clutch arranged between the input shaft and the internal combustion engine 2. The first clutch 3 is preferably integrated within the construction of the first pulley 4 to achieve a compact design, so that for example a central part of the first clutch 3 is connected to the drive shaft of the internal combustion engine 2 and an outer part of the first clutch 3 is releasably connected to the central part via friction means. The outer part of the first clutch is further connected to the input shaft 12. In this way, the width of the first clutch and the first pulley will only extend the length of the transmission unit 17 with a few centimeters.

The internal combustion engine 2 is started by engaging the first clutch 3 and the rotational energy stored in the input shaft, the torque converter and the auxiliary drive source is transferred from the input shaft 12 to the internal combustion engine via the drive shaft 18. When the internal combustion engine 2 is delivering power to the hybrid vehicle 1, the first clutch 3 is in its closed state and connecting the input shaft 12 to the internal combustion engine 2. When the internal combustion engine 2 is shut down, the first clutch 3 disengages the input shaft from the internal combustion engine 2 so that the first clutch is in its open state. In this way the internal combustion engine 2 is disconnected from the input shaft 12 and other parts of the transmission unit 17 when only the auxiliary drive source 7 is delivering power to the hybrid vehicle 1.

The input shaft 12 is connected to a torque converter 10 of the gearbox 8. The torque converter allows the rotational speed of the input shaft 12 and the second clutch 5 to differ somewhat in order to improve the driveability of the vehicle at specific conditions. When there is no need to allow different rotational speeds of the input shaft and the second clutch, the lock-up clutch of the torque converter is engaged, such that the rotational speed of the input shaft 12 and the second clutch 5 will be the same. At e.g. low engine speeds and when a gear is changed, the lock-up clutch is preferably disengaged, i.e. open.

The second clutch 11 is connecting the torque converter 10 to the transmission 14. The second clutch 11 is preferably of a traditional clutch type as used for either manual or automatic transmissions. The transmission 14 delivers torque to at least one of the driving wheels 16 of the hybrid vehicle 1. The second clutch 11 is arranged to engage the transmission 14 in a closed state when delivering torque from the internal combustion engine 2 or the auxiliary drive source 7 through the torque converter 10 to the at least one driving wheel 16, and to disengage the transmission 14 in an open state in relation to the input shaft 12 when not delivering torque to the at least one driving wheel 16. Between the open state and closed state of the second clutch 11 there is a slip region. The slip occurs when the second clutch 11 is shifting from being engaged to being disengaged, or vice versa. In reality this means that the part of the second clutch 11 connected to the torque converter 10 has a different rotational speed compared to the part of the second clutch 11 being connected to the transmission. This difference in rotational speed is called slip and can be used to maintain a determined torque transfer level between the input shaft 12 through the torque converter 10 and the transmission 14. The slip could be varied depending on the torque level needed. When the second clutch 11 is fully engaged there is no slip and in the same way there is no slip when the second clutch 11 is fully disengaged.

When starting the internal combustion engine 2, the first clutch 3 is disengaged so that the input shaft 12 is disconnected from the internal combustion engine. The second clutch 11 is disengaged to a predetermined torque level. This predetermined torque level could be set to meet the torque requirements needed depending on the driving situation of the hybrid vehicle 1 and also depending on the power needed to accelerate the input shaft 12 and the torque converter 10. The predetermined torque level may vary from a fully open state where no torque is transferred to an almost fully closed state where more or less all torque available is transferred to the driving wheels. When the first clutch 3 is disengaged and the second clutch 11 is disengaged to a predetermined torque level, the input shaft and the torque converter are accelerated with the auxiliary drive source 7 to a predetermined rotational speed. The rotational speed can be varied depending on the driving situation of the hybrid vehicle 1. In low engine temperature situations for example, a higher energy level needs to be stored in the input shaft and the torque converter to start the internal combustion engine 2 compared to higher engine temperature levels. When the input shaft and the torque converter have reached the desired rotational speed, the first clutch 3 is engaged to start the internal combustion engine 2 with the energy stored in the input shaft, the torque converter and the auxiliary drive source.

There are two main starting sequences for the internal combustion engine 2 of the hybrid vehicle 1. The first starting sequence is a so called impulse-start, which is used due to battery limitations for starting the internal combustion engine in cold weather conditions with very low temperatures and limited battery power when the hybrid vehicle 1 is not running. The second starting sequence is a so called slip-start, which is used for starting the internal combustion engine 2 when the vehicle is running.

The hybrid vehicle 1 uses in the shown example a 48 V electrical system with lithium-ion batteries as electric energy storage device 19. The 48 V lithium-ion type of batteries are in cold weather conditions limited in power, which makes it difficult to start the internal combustion engine in low temperature situations, such as in temperatures below −15° C. or even as low as −30° C., by only using the auxiliary drive source 7 as starter motor. At very low temperatures, the friction or drag torque in the internal combustion engine 2 could exceed the maximum torque available from the auxiliary drive source in a 48 V electrical system, especially for diesel engines. Thus, cold starts at low temperatures using only the auxiliary drive source may be difficult or even impossible.

It is also possible to design the hybrid vehicle 1 with an auxiliary drive source that itself cannot deliver the maximal required torque for starting the internal combustion engine 2 in low temperature situations. The internal combustion engine 2 is started with the energy stored in the input shaft, in the torque converter and in the auxiliary drive source. The auxiliary drive source is used for accelerating the input shaft and the torque converter to the desired rotational speed. In this way a compact and cost efficient design for the electric machine can be achieved.

The impulse-start sequence is used for starts when the hybrid vehicle 1 is not running, such as when the vehicle is in a stand still position and the internal combustion engine 2 needs to be started. This is for example the case when the hybrid vehicle 1 is started in low temperature situations as described above. In the impulse-start sequence, the first clutch 3 is disengaged so that the input shaft and the torque converter are disconnected from the internal combustion engine. The second clutch 11 is disengaged to a fully open state so that the predetermined torque level is set so that no torque is transferred, i.e. the predetermined torque level is zero. When the first clutch 3 is disengaged and the second clutch 11 is disengaged to a fully open state, the input shaft and the torque converter are accelerated with the auxiliary drive source 7 to a predetermined rotational speed. When the input shaft and the torque converter has reached the desired rotational speed, the first clutch 3 is engaged to start the internal combustion engine 2 with the energy stored in the input shaft, the torque converter and the auxiliary drive source. When the internal combustion engine 2 is running, the second clutch 11 is preferably engaged to deliver torque to the at least one driving wheel 16 of the hybrid vehicle 1.

As an example to describe the impulse-start sequence, the auxiliary drive source 7 may have the capacity to deliver a maximum torque of 150 Nm to the hybrid vehicle 1. To start the internal combustion engine, the first clutch 3 is disengaged so that the input shaft and the torque converter are disconnected from the internal combustion engine. The second clutch 11 is fully disengaged so there is no torque transfer. When the first clutch 3 and the second clutch 11 are disengaged, the input shaft and the torque converter are accelerated with the auxiliary drive source 7 to a predetermined rotational speed. To accelerate the input shaft and the torque converter, the available torque level from the auxiliary drive source 7 of 150 Nm may be used. When the input shaft and the torque converter have reached the desired rotational speed, the first clutch 3 is engaged to start the internal combustion engine 2 with the energy stored in the input shaft, the torque converter and the auxiliary drive source.

The mass and rotational speed of the input shaft and the torque converter could be varied depending on the type of internal combustion engine used in the hybrid vehicle, engine temperature and start situation, but typically the torque required to start the internal combustion engine in the impulse-start mode ranges between 100-500 Nm. The time period needed to accelerate the input shaft and the torque converter to the desired rotational speed is typically 200 ms to 15 s and may vary depending on engine temperature, inertia of the input shaft and the torque converter and the available power from the electric energy storage device. The rotational speed of the input shaft and the torque converter may range between 100 rpm and 5000 rpm and the inertia of the input shaft and the torque converter may range between 0.05 kgm$^2$ and 0.40 kgm$^2$.

The slip-start sequence is used for starts when the hybrid vehicle 1 is running, such as when the vehicle is powered by the auxiliary drive source 7 and internal combustion engine 2 needs to be started to deliver extra power to the hybrid vehicle 1. This is for example the case when the hybrid vehicle 1 is running at low speeds and there is need for accelerating the hybrid vehicle 1 or when driving in shifting terrain where extra power is needed when driving uphill. In the slip-start sequence, the first clutch 3 is disengaged so that the input shaft and the torque converter are disconnected from the internal combustion engine. The second clutch 11 is disengaged to a predetermined torque level, which is set so that there is a slip in the second clutch. The second clutch 11 is thus set so that torque is transferred, i.e. the predetermined torque level is above zero. When the first clutch 3 is disengaged and the second clutch 11 is disengaged to the predetermined torque level, the input shaft and the torque converter are accelerated with the auxiliary drive source 7 to a predetermined rotational speed. When the input shaft and the torque converter have reached the desired rotational speed, the first clutch 3 is engaged to start the internal combustion engine 2 with the energy stored in the input shaft, the torque converter and the auxiliary drive source. When the internal combustion engine 2 is running, the second clutch 11 is preferably engaged to a fully engaged state to deliver torque to the at least one driving wheel 16 of the hybrid vehicle 1. When using traditional methods to start the internal combustion engine 2, hesitation may occur due to the fact that the torque needed to start the internal combustion engine 2 will impact the driveline of the hybrid vehicle 1. Normally, the drive wheels are disengaged completely in order to start the engine. With the above described method, the predetermined torque level in the second clutch 11 and slip will secure that no hesitation occurs.

As an example to describe the slip-start sequence, the auxiliary drive source 7 may have the capacity to deliver a maximum torque of 150 Nm to the hybrid vehicle 1. In a specific situation in an electrical driving mode, the auxiliary drive source 7 delivers 100 Nm for driving the hybrid vehicle 1. If the driving situation changes and there is for example a need to deliver 180 Nm to the hybrid vehicle 1, the auxiliary drive source 7 will not have enough power to deliver the desired torque level and the internal combustion engine 2 needs to be started in order to deliver the torque required. To start the internal combustion engine, the first clutch 3 is disengaged so that the input shaft and the torque converter are disconnected from the internal combustion engine. The second clutch 11 is disengaged to a predetermined torque level, for example 100 Nm, and is set so that there is a slip to maintain the 100 Nm torque level until the input shaft and the torque converter are accelerated to start the internal combustion engine 2. When the first clutch 3 is disengaged and the second clutch 11 is disengaged to the predetermined torque level of 100 Nm, the input shaft and the torque converter are accelerated with the auxiliary drive source 7 to a predetermined rotational speed. To accelerate the input shaft and the torque converter, the remaining available torque level of the auxiliary drive source 7 of 50 Nm may be used so that the maximum torque level of 150 Nm of the auxiliary drive source is utilized. When the input shaft and the torque converter have reached the desired rotational speed, the first clutch 3 is engaged to start the internal combustion engine 2 with the energy stored in the input shaft, the torque converter and the auxiliary drive source.

The mass and rotational speed of the input shaft and the torque converter could be varied depending on the type of internal combustion engine used in the hybrid vehicle and the driving situation, but typically the torque required to start the internal combustion engine in the slip-start mode ranges between 50-200 Nm. The time period needed to accelerate the input shaft and the torque converter to the desired rotational speed is very short and typically ranging between 200 ms and 500 ms. The rotational speed of the input shaft and the torque converter may range between 50 rpm and 1000 rpm above the rotational speed of the internal combustion engine and the inertia of the input shaft and the torque converter may range between 0.05 kgm$^2$ and 0.40 kgm$^2$. The rotational speed of the internal combustion engine may typically range between 500 rpm and 3000 rpm when the slip-start mode is used.

In the slip-start example above, the auxiliary drive source delivers 100 Nm to the hybrid vehicle 1 during acceleration of the input shaft and the torque converter and 50 Nm to the acceleration of the input shaft and the torque converter. Thus, the maximum torque level of 150 Nm is delivered from the auxiliary drive source 7. Once the internal combustion engine 2 has started, the power from the auxiliary drive source 7 can be decreased depending on the driving situation or even be set to deliver no torque at all so that the hybrid vehicle 1 is powered only by the internal combustion engine 2. If needed, the auxiliary drive source may be used for charging the electric energy storage device with power from the internal combustion engine 2 or from recovering braking energy.

The system for starting the internal combustion engine 2 is adapted to be used in the hybrid vehicle 1. The hybrid vehicle 1 is provided with a control unit 15, which is adapted to control the system and method for starting the internal combustion engine. The control unit 15 is connected to the control system of the hybrid vehicle 1, which for example controls the internal combustion engine 2 and other parts of the hybrid vehicle 1. The method steps are preferably performed by a computer program and a computer program product contained and run in the electronic control unit of the vehicle.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Hybrid vehicle
2: Internal combustion engine
3: First clutch
4: First pulley
5: Second pulley
6: Flexible driving member
7: Auxiliary drive source
8: Gearbox
9: Lock-up clutch
10: Torque converter
11: Second clutch
12: Input shaft
13: Shaft
14: Transmission
15: Control unit
16: Driving wheel
17: Transmission unit
18: Drive shaft
19: Electric energy storage device

The invention claimed is:

1. A method for starting an internal combustion engine of a hybrid vehicle, wherein the internal combustion engine is adapted to rotate a drive shaft providing torque to at least one driving wheel of the hybrid vehicle via a transmission unit, wherein the transmission unit comprises a first clutch connecting the internal combustion engine to an input shaft of a gearbox, wherein the input shaft is connected to a torque converter provided with a lock-up clutch, wherein the torque converter is connected to a second clutch connecting the torque converter to the at least one driving wheel through a transmission, and wherein the input shaft further is connected between the gearbox and pulleys, the pulleys connected to an auxiliary drive source in an offset arrangement, and the pulleys with a predetermined torque ratio and between the input shaft and the auxiliary drive source; the method comprising:

disengaging the first clutch;
disengaging the second clutch to a predetermined torque level to a value within a range between fully open through almost fully closed;
accelerating the input shaft and the torque converter with the auxiliary drive source to a predetermined rotational speed based on the disengaging of the first clutch and the second clutch; and
engaging the first clutch to start the internal combustion engine with the energy stored in the input shaft, in the torque converter, and in the auxiliary drive source.

2. The method according to claim 1, wherein the lock-up clutch is engaged when the input shaft and the torque converter are accelerated by the auxiliary drive source.

3. The method according to claim 1, wherein the lock-up clutch is disengaged when the input shaft and the torque converter are accelerated by the auxiliary drive source.

4. The method according to claim 1, wherein the predetermined torque level of the second clutch is zero.

5. The method according to claim 1, wherein the predetermined rotational speed of the input shaft ranges between 100 rotations per minute (rpm) and 500 rpm.

6. The method according to claim 1, wherein the predetermined torque level of the second clutch is above zero and the predetermined torque level is maintained until the input shaft is accelerated to start the internal combustion engine.

7. The method according to claim 6, wherein the predetermined torque level of the second clutch is between 30 Newton meter (Nm) and 300 Nm.

8. The method according to claim 6, wherein the predetermined rotational speed of the input shaft is between 50 rotations per minute (rpm) and 1000 rpm above the rotational speed of the internal combustion engine.

9. The method according to claim 1, wherein the second clutch is engaged to a fully engaged state to deliver torque to the at least one driving wheel of the hybrid vehicle when the internal combustion engine has started.

10. The method according to claim 1, wherein the predetermined torque ratio of the pulleys between the input shaft and the auxiliary drive source ranges between 1:2 and 1:4.

11. A non-transitory, computer-readable storage medium storing instructions executable by an electronic control unit of a hybrid vehicle comprising an internal combustion engine adapted to rotate a drive shaft providing torque to at least one driving wheel of the hybrid vehicle via a transmission unit, wherein the transmission unit comprises a first clutch connecting the internal combustion engine to an input shaft of a gearbox, wherein the input shaft is connected to a torque converter provided with a lock-up clutch, wherein the torque converter is connected to a second clutch connecting the torque converter to the at least one driving wheel through a transmission, and wherein the input shaft further is connected between the gearbox and pulleys, the pulleys connected to an auxiliary drive source in an offset arrangement, and the pulleys with a predetermined torque ratio and between the input shaft and the auxiliary drive source, which when executed cause the electronic control unit to:

disengage the first clutch;
disengage the second clutch to a predetermined torque level to a value within a range between fully open through almost fully closed;
accelerate the input shaft and the torque converter with the auxiliary drive source to a predetermined rotational speed based on the disengagement of the first clutch and the second clutch; and engage the first clutch to start the internal combustion engine with the energy stored in the input shaft, in the torque converter, and in the auxiliary drive source.

12. The non-transitory, computer-readable storage medium of claim 11, wherein the predetermined torque level of the second clutch is above zero and the predetermined torque level is maintained until the input shaft is accelerated to start the internal combustion engine.

13. The non-transitory, computer-readable storage medium of claim 12, wherein the predetermined torque level of the second clutch is between 30 Newton meter (Nm) and 300 Nm.

14. The non-transitory, computer-readable storage medium of claim 12, wherein the predetermined rotational speed of the input shaft is between 50 rotations per minute (rpm) and 1000 rpm above the rotational speed of the internal combustion engine.

15. The non-transitory, computer-readable storage medium of claim 11, wherein the lock-up clutch is engaged when the input shaft and the torque converter are accelerated by the auxiliary drive source.

16. The non-transitory, computer-readable storage medium of claim 11, wherein the lock-up clutch is disengaged when the input shaft and the torque converter are accelerated by the auxiliary drive source.

17. The non-transitory, computer-readable storage medium of claim 11, wherein the predetermined torque level of the second clutch is zero.

18. The non-transitory, computer-readable storage medium of claim 11, wherein the predetermined rotational speed of the input shaft ranges between 100 rotations per minute (rpm) and 500 rpm.

19. The non-transitory, computer-readable storage medium of claim 11, wherein the second clutch is engaged to a fully engaged state to deliver torque to the at least one driving wheel of the hybrid vehicle when the internal combustion engine has started.

20. The non-transitory, computer-readable storage medium of claim 11, wherein the predetermined torque ratio of the pulleys between the input shaft and the auxiliary drive source ranges between 1:2 and 1:4.

* * * * *